(12) United States Patent
Cai et al.

(10) Patent No.: US 12,561,526 B2
(45) Date of Patent: Feb. 24, 2026

(54) METHOD AND SYSTEM FOR EXTRACTING KEY PHRASES

(71) Applicant: JPMorgan Chase Bank, N.A., New York, NY (US)

(72) Inventors: Yang Cai, Seattle, WA (US); Reza Amini, Mercer Island, WA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 161 days.

(21) Appl. No.: 18/530,541

(22) Filed: Dec. 6, 2023

(65) Prior Publication Data

US 2025/0190701 A1 Jun. 12, 2025

(51) Int. Cl.
*G06F 40/289* (2020.01)

(52) U.S. Cl.
CPC ................................. *G06F 40/289* (2020.01)

(58) Field of Classification Search
CPC .. G06F 3/0481; G06F 16/24578; G06F 16/30; G06F 16/3329; G06F 16/334; G06F 16/3344; G06F 16/335; G06F 16/345; G06F 40/131; G06F 40/143; G06F 40/169; G06F 40/205; G06F 40/211; G06F 40/242; G06F 40/284; G06F 40/289; G06F 40/30; G06F 40/40; G06F 40/56; G06F 16/313; G06F 16/90335; G06F 40/279; G06F 40/295; G06F 40/35; G06N 3/045; G06N 3/0499; G06N 3/09; G06N 5/02; G06N 5/041; G06N 20/00; G06Q 30/0631; G10L 15/1815
See application file for complete search history.

(56) References Cited

U.S. PATENT DOCUMENTS

| | | | | |
|---|---|---|---|---|
| 7,702,680 B2 * | 4/2010 | Yih | ........................ | G06F 16/345 |
| | | | | 707/750 |
| 7,792,667 B2 * | 9/2010 | Chaney | .................... | G06F 16/30 |
| | | | | 704/251 |
| 8,209,335 B2 * | 6/2012 | Novak | ................... | G06F 16/345 |
| | | | | 707/741 |
| 8,892,422 B1 * | 11/2014 | Kumar | ................... | G06F 40/284 |
| | | | | 704/10 |
| 10,847,140 B1 * | 11/2020 | Conner | ............... | G10L 15/1815 |
| 12,216,983 B2 * | 2/2025 | Narayanan | ............ | G06F 40/169 |
| 2004/0122657 A1 * | 6/2004 | Brants | .................... | G06F 40/131 |
| | | | | 704/9 |
| 2007/0067289 A1 * | 3/2007 | Novak | ................... | G06F 40/289 |
| 2009/0193337 A1 * | 7/2009 | Carter | ................... | G06F 3/0481 |
| | | | | 715/277 |
| 2009/0234836 A1 * | 9/2009 | Peng | ..................... | G06F 16/313 |
| | | | | 707/999.005 |

(Continued)

*Primary Examiner* — Gerald Gauthier
(74) *Attorney, Agent, or Firm* — GREENBLUM & BERNSTEIN, P.L.C.

(57) ABSTRACT

A method for extracting key phrases based on extracting both informative and readable phrases from documents. The method includes separating documents into sentences to extract sentence-level phrases and separating the documents into segments of a fixed length to extract segment-level phrases. The method further includes using a PMI and entropy model to also extract readable phrases from the documents. The method includes comparing the sentence-level phrases, the segment-level phrases, and the readable phrases to generate key phrases for the documents.

20 Claims, 5 Drawing Sheets

500

(56) References Cited

U.S. PATENT DOCUMENTS

| | | | | |
|---|---|---|---|---|
| 2009/0265330 A1* | 10/2009 | Cheng | G06F 16/335 | 707/999.005 |
| 2010/0145678 A1* | 6/2010 | Csomai | G06F 40/169 | 704/10 |
| 2010/0153365 A1* | 6/2010 | Shemtov | G06F 40/289 | 707/E17.014 |
| 2010/0179801 A1* | 7/2010 | Huynh | G06F 40/56 | 704/1 |
| 2010/0185685 A1* | 7/2010 | Chew | G06F 16/334 | 707/E17.015 |
| 2010/0332217 A1* | 12/2010 | Wintner | G06F 40/211 | 704/9 |
| 2012/0117092 A1* | 5/2012 | Stankiewicz | G06F 16/3329 | 707/755 |
| 2013/0185307 A1* | 7/2013 | El-Yaniv | G06F 16/24578 | 707/E17.069 |
| 2016/0085742 A1* | 3/2016 | Mahmud | G06F 40/289 | 704/9 |
| 2016/0203132 A1* | 7/2016 | King | G06F 40/30 | 704/9 |
| 2016/0299881 A1* | 10/2016 | Gupta | G06F 40/40 | |
| 2016/0321244 A1* | 11/2016 | Hashimoto | G06F 16/335 | |
| 2016/0350283 A1* | 12/2016 | Carus | G06F 40/284 | |
| 2016/0357854 A1* | 12/2016 | Hashimoto | G06F 16/3344 | |
| 2017/0061085 A1* | 3/2017 | Nossal | G06F 40/211 | |
| 2020/0302011 A1* | 9/2020 | Mishra | G06F 40/242 | |
| 2022/0222437 A1* | 7/2022 | Lauber | G06N 3/0499 | |
| 2023/0091076 A1* | 3/2023 | Yang | G06N 5/02 | 704/9 |
| 2023/0096564 A1* | 3/2023 | Nakayama | G06F 40/284 | 707/769 |
| 2023/0153540 A1* | 5/2023 | Galitsky | G06Q 30/0631 | 704/9 |
| 2023/0153546 A1* | 5/2023 | Peleg | G06F 40/56 | 704/9 |
| 2023/0169267 A1* | 6/2023 | Misra | G06N 3/09 | 704/9 |
| 2023/0169271 A1* | 6/2023 | Shailabh | G06F 40/40 | 704/9 |
| 2023/0196020 A1* | 6/2023 | Thoniparambil | G06F 40/35 | 704/9 |
| 2023/0237269 A1* | 7/2023 | Guzik | G06F 40/295 | 704/9 |
| 2023/0237399 A1* | 7/2023 | Hoang | G06N 3/045 | 704/9 |
| 2023/0244879 A1* | 8/2023 | Zhang | G06F 40/30 | 704/9 |
| 2023/0259692 A1* | 8/2023 | Wright | G06F 40/56 | 704/9 |
| 2023/0259713 A1* | 8/2023 | Religa | G06N 20/00 | 704/9 |
| 2023/0315998 A1* | 10/2023 | Sundaram | G06F 40/279 | 704/9 |
| 2023/0325598 A1* | 10/2023 | Risuleo | G06F 40/143 | 704/9 |
| 2025/0156468 A1* | 5/2025 | Randle-Conde | G06F 40/205 | |
| 2025/0190701 A1* | 6/2025 | Cai | G06F 40/289 | |

* cited by examiner

400

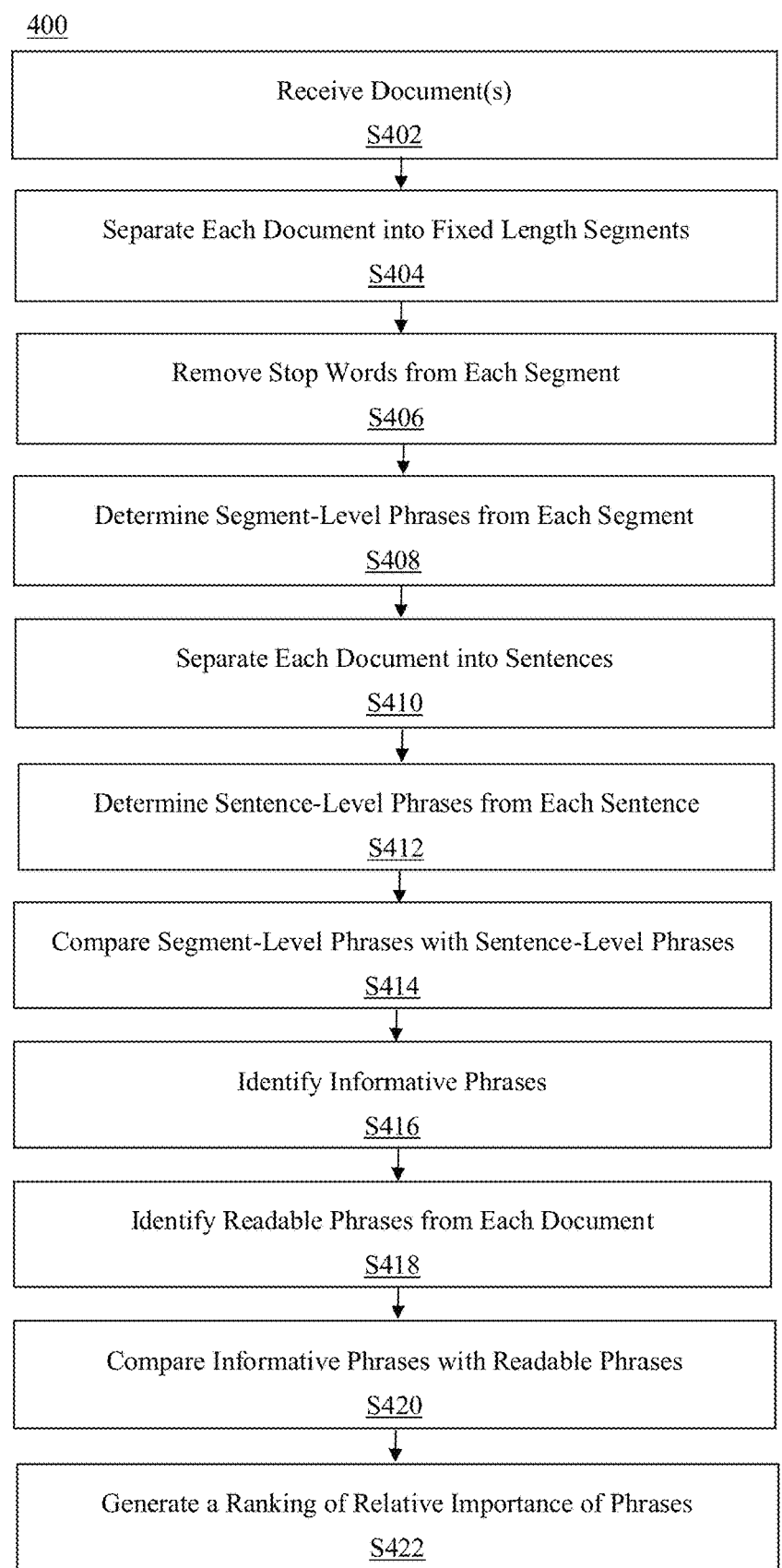

Receive Document(s)

S402

Separate Each Document into Fixed Length Segments

S404

Remove Stop Words from Each Segment

S406

Determine Segment-Level Phrases from Each Segment

S408

Separate Each Document into Sentences

S410

Determine Sentence-Level Phrases from Each Sentence

S412

Compare Segment-Level Phrases with Sentence-Level Phrases

S414

Identify Informative Phrases

S416

Identify Readable Phrases from Each Document

S418

Compare Informative Phrases with Readable Phrases

S420

Generate a Ranking of Relative Importance of Phrases

METHOD AND SYSTEM FOR EXTRACTING KEY PHRASES

BACKGROUND

1. Field of the Disclosure

This technology generally relates to methods and systems for extracting key phrases, and more particularly to methods and systems for extracting both informative and readable phrases from multiple documents to generate key phrases.

2. Background Information

Analysts and traders of quantitative departments discuss ideas and negotiate trade opportunities over phone, emails, and live chat software, which makes them rich sources for understanding the market color and trending discussion topics. Extracting readable and informative key phrases plays a crucial role in extracting insights from chats and documents.

Current approaches for key phrase extraction (KPE) are mainly divided into two categories: supervised and unsupervised models. Both categories have their own disadvantages.

Supervised KPE approaches usually struggle with emerging and/or domain-specific phrases and requires lots of labeling effort from domain experts.

Unsupervised KPE approaches (e.g., Latent Dirichlet Allocation (LDA)), also suffer from informativeness and readability issues. For example, they can extract 'Russia', 'Oil', and 'Price' as keywords, but miss the readable and informative connection between them, which delivers the main message, Russia raised oil prices.

Accordingly, there is a need for a new KPE approach that is capable of extracting key phrases and provide insights over chats and/or documents, defining metrics to evaluate relative importance of key phrases, and providing a comprehensive solution to extract insights from the chats and/or documents.

SUMMARY

The present disclosure, through one or more of its various aspects, embodiments, and/or specific features or sub-components, provides, inter alia, various systems, servers, devices, methods, media, programs, and platforms for extracting both informative and readable phrases from multiple documents. According to an aspect of the present disclosure, a method for extracting key phrases is provided. The method is implemented by at least one processor. The method includes: receiving, by the at least one processor, at least one document; analyzing, by the at least one processor, each of the at least one document in order to identify a plurality of segments having a predetermined fixed number of words, and removing stop words from each respective one of the plurality of segments; applying, by the at least one processor, at least one large language model (LLM) to the plurality of segments to identify at least one segment-level phrase from each of the at least one document, and extracting, by the at least one processor, each of the at least one segment-level phrase from each of the at least one document; analyzing, by the at least one processor, each of the at least one document in order to identify a plurality of sentences; applying, by the at least one processor, the at least one LLM to the plurality of sentences to identify at least one sentence-level phrase from each of the at least one document; extracting, by the at least one processor, each of the at least one sentence-level phrase from each of the at least one document; comparing, by the at least one processor, each of the at least one segment-level phrase with each of the at least one sentence-level phrase to determine at least one informative phrase based on a determination that at least one of the at least one sentence-level phrase at least partially matches a respective at least one of the at least one segment-level phrase; calculating, by the at least one processor, pointwise mutual information (PMI) between words for each of the at least one document to identify at least one readable phrase having a PMI value that is equal to or greater than a predetermined PMI threshold value, wherein the readable phrase includes the stop words; extracting, by the at least one processor, the at least one readable phrase from each of the at least one document; and generating an output that indicates each of the at least one readable phrase and each of the at least one informative phrase.

The method may further include comparing, by the at least one processor, each of the at least one informative phrase with each of the at least one readable phrase to determine if at least one of the at least one informative phrase at least partially matches a respective at least one of the at least one readable phrase; and assigning, by the at least one processor, a category to at least one of the at least one readable phrase, wherein the category is based on the at least one of the at least one informative phrase that at least partially matches with the respective at least one of the at least one readable phrase.

The applying of the at least one LLM to the plurality of segments may include comparing groupings of words from each of the plurality of segments, in which the stop words have been removed, to respective original segments with the stop words for determining a respective first similarity value for each of the groupings of words, and identifying the at least one segment-level phrase from each of the groupings of words when the respective first similarity value is equal to or greater than a predetermined first similarity threshold value.

The applying of the at least one LLM to the plurality of sentences may include using an attention matrix that places each respective sentence into the attention matrix and compares each respective word from each respective sentence with each respective word from remaining sentences of a respective same document; determining matching sequences of words from the attention matrix to identify at least one matching phrase; and selecting the at least one sentence-level phrase by filtering each of the at least one matching phrase by using part-of-speech (POS) tagging that labels each respective word in each of the at least one matching phrase with a corresponding part of speech.

The calculating of the PMI between words may include determining, by the at least one processor, a probability that a first grouping of words appears together within a document; selecting, by the at least one processor, at least one common phrase from the first grouping of words in which the determined probability is equal to or greater than a predetermined threshold percentage; calculating an entropy with respect to the at least one common phrase that relates to a measure of randomness in words on each side of the at least one common phrase; and identifying, based on the calculated entropy, the at least one readable phrase.

The applying of the at least one LLM to the plurality of segments may include embedding the at least one document by converting each respective word from the at least one document into a corresponding numeric vector; and selecting, by the at least one processor using a transformer-based encoder that uses the numeric vectors to determine a second similarity value between each segment-level phrase and a whole of the respective at least one document, the at least one segment-level phrase for which the second similarity value is equal to or higher than a predetermined second similarity threshold value.

The applying of the at least one LLM to the plurality of sentences may include selecting, by the at least one processor using transformer-based phrasing that uses the numeric vectors to determine a semantic similarity value between each sentence-level phrase and a whole of the respective at least one document, at least one sentence-level phrase for which the semantic similarity value is equal to or higher than a predetermined semantic similarity value.

The comparing of the each of the at least one segment-level phrase with the each of the at least one sentence-level phrase may include applying fuzzy matching that analyzes a percentage of similarity between the at least one segment-level phrase and the at least one sentence-level phrase for the determination of the at least partial match.

The method may further include comparing, by the at least one processor, each of the at least one informative phrase with each of the at least readable phrase to determine at least one key phrase which relates to each of the at least one readable phrase that at least partially matches a respective at least one of the at least one informative phrase; and generating an output that indicates the at least one key phrase.

The method may further include calculating, by the at least one processor, a respective frequency of occurrence for each of the at least one informative phrase and each of the at least one readable phrase within each respective document of the at least one document; calculating, by the at least one processor, a uniqueness for each of the at least one informative phrase and each of the at least one readable phrase within each respective document of the at least one document; generating, by the at least one processor, a ranking of importance that includes each of the at least one informative phrase and each of the at least one readable phrase, wherein the ranking of importance is based on a result of a combination of the frequency of occurrence and the uniqueness for each of the at least one informative phrase and each of the at least one readable phrase; and displaying, via a graphical user interface (GUI), the ranking of importance.

According to another aspect of the present disclosure, a computing apparatus for generating key phrases is provided. The computing apparatus includes a processor; a memory; a display; and a communication interface coupled to each of the processor, the memory, and the display. The processor is configured to: receive, via the communication interface, at least one document; analyze each of the at least one document in order to identify a plurality of segments having a predetermined fixed number of words, and removing stop words from each respective one of the plurality of segments; apply at least one LLM to the plurality of segments to identify at least one segment-level phrase from each of the at least one document, and extract each of the at least one segment-level phrase from each of the at least one document; analyze each of the at least one document in order to identify a plurality of sentences; apply the at least one LLM to the plurality of sentences to identify at least one sentence-level phrase from each of the at least one document; extract each of the at least one sentence-level phrase from each of the at least one document; compare each of the at least one segment-level phrase with each of the at least one sentence-level phrase to determine at least one informative phrase based on a determination that at least one of the at least one sentence-level phrase at least partially matches a respective at least one of the at least one segment-level phrase; calculate PMI between words for each of the at least one document to identify at least one readable phrase having a PMI value that is equal to or greater than a predetermined PMI threshold value, wherein the readable phrase includes the stop words; extract the at least one readable phrase from each of the at least one document; and generate an output that indicates each of the at least one readable phrase and each of the at least one informative phrase.

The processor may be further configured to compare each of the at least one informative phrase with each of the at least one readable phrase to determine if at least one of the at least one informative phrase at least partially matches a respective at least one of the at least one readable phrase; and assign a category to at least one of the at least one readable phrase, wherein the category is based on the at least one of the at least one informative phrase that at least partially matches with the respective at least one of the at least one readable phrase.

The processor may be further configured to apply the at least one LLM to the plurality of segments by comparing groupings of words from each of the plurality of segments, in which the stop words have been removed, to respective original segments with the stop words for determining a respective first similarity value for each of the groupings of words, and identifying the at least one segment-level phrase from each of the groupings of words when the respective first similarity value is equal to or greater than a predetermined first similarity threshold value.

The processor may be further configured to apply the at least one LLM to the plurality of sentences by using an attention matrix that places each respective sentence into the attention matrix and compares each respective word from each respective sentence with each respective word from remaining sentences of a respective same document, determining matching sequences of words from the attention matrix to identify at least one matching phrase, and selecting the at least one sentence-level phrase by filtering each of the at least one matching phrase by using POS tagging that labels each respective word in each of the at least one matching phrase with a corresponding part of speech.

The processor may be further configured to calculate the PMI between words by determining a probability that a first grouping of words appears together within a document, selecting at least one common phrase from the first grouping of words in which the determined probability is equal to or greater than a predetermined threshold percentage, calculating an entropy with respect to the at least one common phrase that relates to a measure of randomness in words on each side of the at least one common phrase, and identifying, based on the calculated entropy, the at least one readable phrase.

The processor may be further configured to apply the at least one LLM to the plurality of segments by embedding the at least one document by converting each respective word from the at least one document into a corresponding numeric vector, and selecting, using a transformer-based encoder that uses the numeric vectors to determine a second similarity value between each segment-level phrase and a whole of the respective at least one document, the at least one segment-level phrase for which the second similarity value is equal to or higher than a predetermined second similarity threshold value.

The processor may be further configured to apply the at least one LLM to the plurality of sentences by selecting, using transformer-based phrasing that uses the numeric vectors to determine a semantic similarity value between each sentence-level phrase and a whole of the respective at least one document, at least one sentence-level phrase for which the semantic similarity value is equal to or higher than a predetermined semantic similarity value.

The processor may be further configured to compare the each of the at least one segment-level phrase with the each of the at least one sentence-level phrase by applying fuzzy matching that analyzes a percentage of similarity between the at least one segment-level phrase and the at least one sentence-level phrase for the determination of the at least partial match.

The processor may be further configured to compare each of the at least one informative phrase with each of the at least readable phrase to determine at least one key phrase which relates to each of the at least one readable phrase that at least partially matches a respective at least one of the at least one informative phrase; and generate an output that indicates the at least one key phrase.

According to yet another aspect of the present disclosure, a non-transitory computer readable storage medium storing instructions for generating key phrases is provided. The storage medium includes executable code which, when executed by a processor, causes the processor to: receive at least one document; analyze each of the at least one document in order to identify a plurality of segments having a predetermined fixed number of words, and removing stop words from each respective one of the plurality of segments; apply at least one LLM to the plurality of segments to identify at least one segment-level phrase from each of the at least one document, and extract each of the at least one segment-level phrase from each of the at least one document; analyze each of the at least one document in order to identify a plurality of sentences; apply the at least one LLM to the plurality of sentences to identify at least one sentence-level phrase from each of the at least one document; extract each of the at least one sentence-level phrase from each of the at least one document; compare each of the at least one segment-level phrase with each of the at least one sentence-level phrase to determine at least one informative phrase based on a determination that at least one of the at least one sentence-level phrase at least partially matches a respective at least one of the at least one segment-level phrase; calculate PMI between words for each of the at least one document to identify at least one readable phrase having a PMI value that is equal to or greater than a predetermined PMI threshold value, wherein the readable phrase includes the stop words; extract the at least one readable phrase from each of the at least one document; and generate an output that indicates each of the at least one readable phrase and each of the at least one informative phrase.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for extracting both informative and readable phrases from multiple documents to generate key phrases.

DETAILED DESCRIPTION

Through one or more of its various aspects, embodiments and/or specific features or sub-components of the present disclosure, are intended to bring out one or more of the advantages as specifically described above and noted below. The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
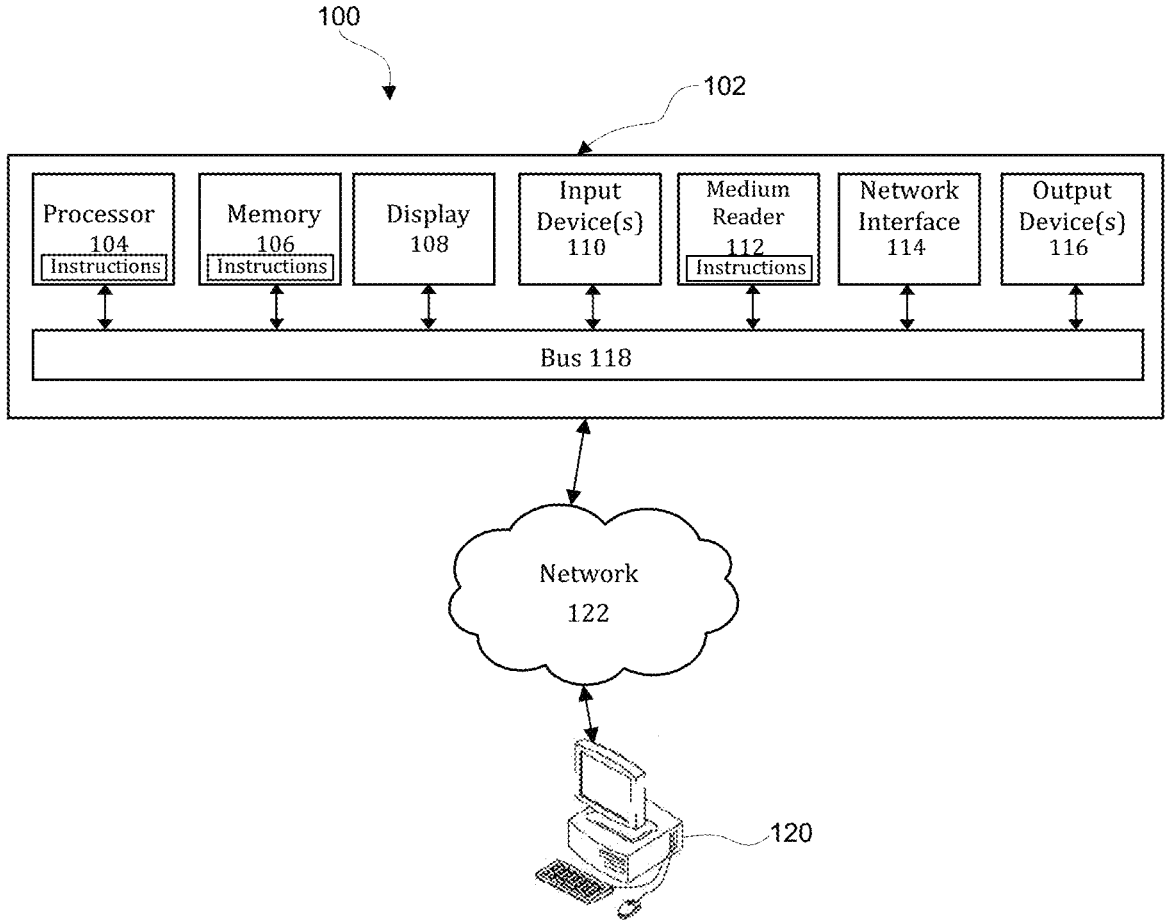
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for extracting both informative and readable phrases from multiple documents to generate key phrases.

Figure 2:
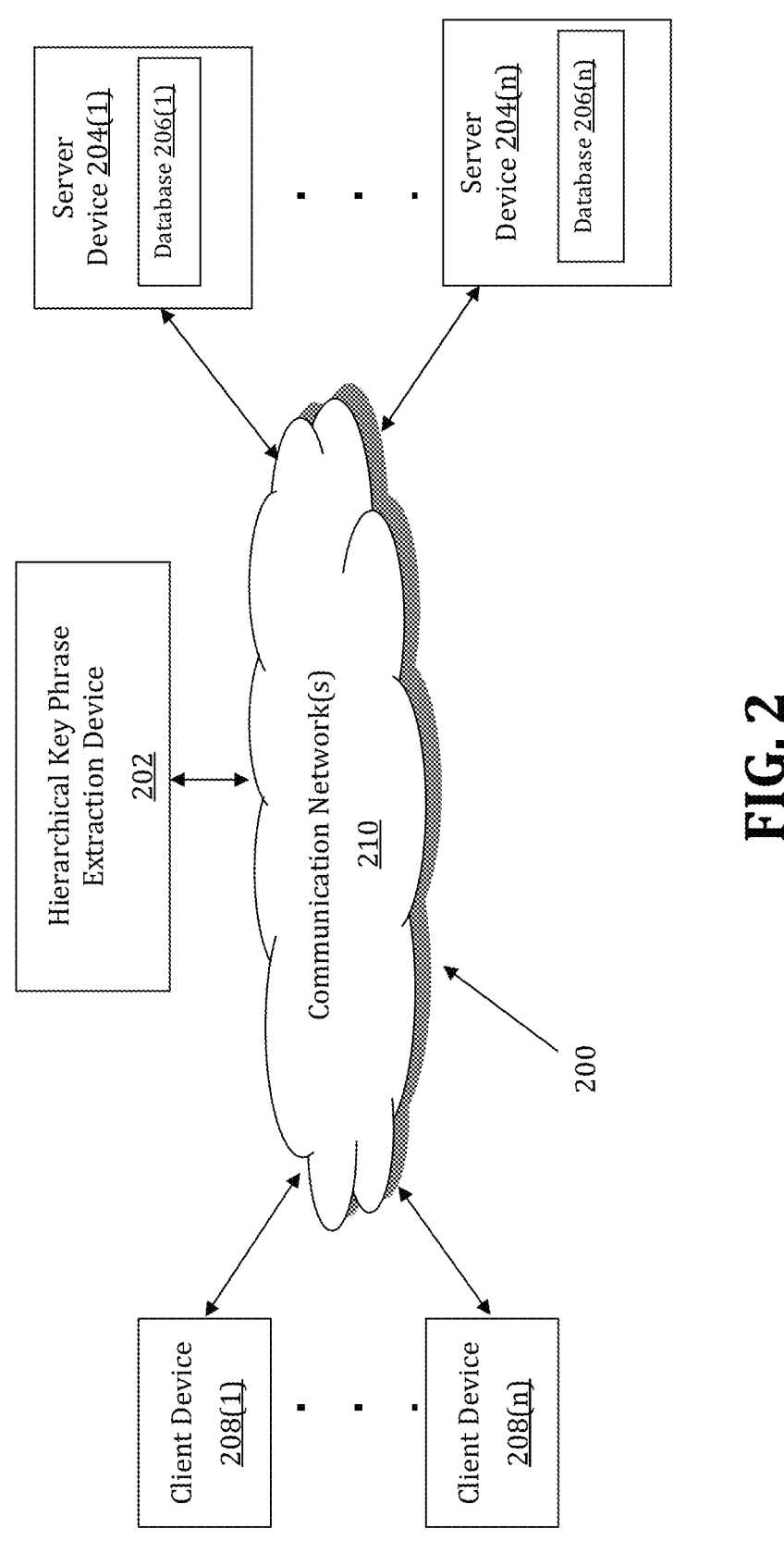
FIG. 2 illustrates an exemplary diagram of a network environment.

Referring to FIG. 2, a schematic of an exemplary network environment 200 for implementing a method for extracting both informative and readable phrases from multiple documents to generate key phrases is illustrated. In an exemplary embodiment, the method is executable on any networked computer platform, such as, for example, a personal computer (PC).

The method for extracting both informative and readable phrases from multiple documents to generate key phrases may be implemented by a hierarchical key phrase extraction (HKPE) device 202. The HKPE device 202 may be the same or similar to the computer system 102 as described with respect to FIG. 1. The HKPE device 202 may store one or more applications that can include executable instructions that, when executed by the HKPE device 202, cause the HKPE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the HKPE device 202 itself, may be located in virtual server(s) running in a cloud-based computing environment rather than being tied to one or more specific physical network computing devices. Also, the application(s) may be running in one or more virtual machines (VMs) executing on the HKPE device 202. Additionally, in one or more embodiments of this technology, virtual machine(s) running on the HKPE device 202 may be managed or supervised by a hypervisor.

In the network environment 200 of FIG. 2, the HKPE device 202 is coupled to a plurality of server devices 204(1)-204(*n*) that hosts a plurality of databases 206(1)-206(*n*) that hosts a plurality of databases 206(1)-206(*n*), and also to a plurality of client devices 208(1)-208(*n*) via communication network(s) 210. A communication interface of the HKPE device 202, such as the network interface 114 of the computer system 102 of FIG. 1, operatively couples and communicates between the HKPE device 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the HKPE device 202, the server devices 204 (1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and HKPE devices that efficiently implement a method for extracting both informative and readable phrases from multiple documents and ranking them based on relative importance.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The HKPE device 202 may be a standalone device or integrated with one or more other devices or apparatuses, such as one or more of the server devices 204(1)-204(*n*), for example. In one particular example, the HKPE device 202 may include or be hosted by one of the server devices 204(1)-204(*n*), and other arrangements are also possible. Moreover, one or more of the devices of the HKPE device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204(*n*) in this example may process requests received from the HKPE device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206 (*n*) that are configured to store data that relates to a document repository and a LLM database.

Although the server devices 204(1)-204(*n*) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the HKPE device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the HKPE device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the HKPE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the HKPE device 202, the server devices 204(1)-204(n), or the client devices 208(1)-208(n), for example, may be configured to operate as virtual instances on the same physical machine. In other words, one or more of the HKPE device 202, the server devices 204 (1)-204(n), or the client devices 208(1)-208(n) may operate on the same physical device rather than as separate devices communicating through communication network(s) 210. Additionally, there may be more or fewer HKPE devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
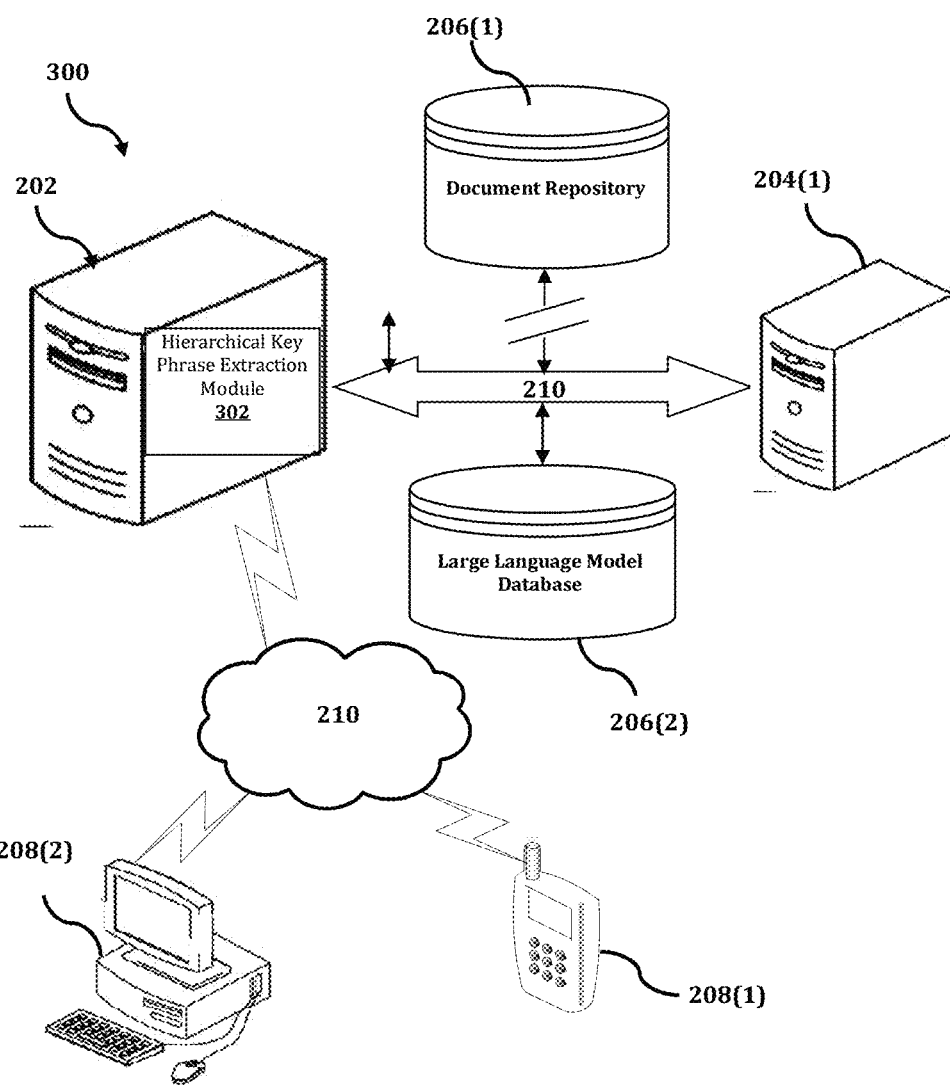
FIG. 3 shows an exemplary system for implementing a method for extracting both informative and readable phrases from multiple documents to generate key phrases.

The HKPE device 202 is described and illustrated in FIG. 3 as including a HKPE module 302, although it may include other rules, policies, modules, databases, or applications, for example. As will be described below, the HKPE module 302 is configured to implement a method for extracting both informative and readable phrases from multiple documents to generate key phrases.

An exemplary process 300 for extracting both informative and readable phrases from multiple documents to generate key phrases by utilizing the network environment of FIG. 2 is illustrated as being executed in FIG. 3. Specifically, a first client device 208(1) and a second client device 208(2) are illustrated as being in communication with the HKPE device 202. In this regard, the first client device 208(1) and the second client device 208(2) may be "clients" of the HKPE device 202 and are described herein as such. Nevertheless, it is to be known and understood that the first client device 208(1) and/or the second client device 208(2) need not necessarily be "clients" of the HKPE device 202, or any entity described in association therewith herein. Any additional or alternative relationship may exist between either or both of the first client device 208(1) and the second client device 208(2) and the HKPE device 202, or no relationship may exist.

Further, HKPE device 202 is illustrated as being able to access a document repository 206(1) and a LLM database 206(2). The HKPE module 302 may be configured to access these databases for implementing a method for extracting both informative and readable phrases from multiple documents to generate key phrases.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the HKPE device 202 via broadband or cellular communication. Of course, these embodiments are merely exemplary and are not limiting or exhaustive.

Upon being started, the HKPE module 302 executes a process for extracting both informative and readable phrases from multiple documents to generate key phrases. An exemplary process for extracting both informative and readable phrases from multiple documents to generate key phrases is generally indicated at flowchart 400 in FIG. 4.

In process 400 of FIG. 4, at step S402, the HKPE module 302 receives at least one document. In an exemplary embodiment, the HKPE module 302 may receive a plurality of documents. The documents may include transcripts for phone conversations, emails, and/or live chat transcripts. In an exemplary embodiment, each document may include analysts' and/or traders' discussions of trade ideas and/or trade negotiations.

At step S404, the HKPE module 302 separates each document into segments or chunks having a predetermined fixed number of words. In an exemplary embodiment, each document can be broken into segments having 100 words. In an exemplary embodiment, the segment length or number of words may be selected by the user. In an exemplary embodiment, the HKPE module 302 feeds the documents into a LLM and applies the LLM for separating the documents.

At step S406 the HKPE module 302 removes stop words from each separated segment. Removing stop words includes removing as many words as possible from the segment without losing contextual information. Once the stop words are removed, the segment is a list of words and/or phrases.

Then, at step S408, the HKPE module 302 determines segment-level phrases from each segment. In an exemplary embodiment, the HKPE module 302 extracts phrases of variable lengths, e.g., between three and five words, and keeps the top non-overlapping phrases, based on the number of words, as segment-level phrases. In an exemplary embodiment, the HKPE module 302 compares the similarity of the list of words and/or phrases with the original document to determine the segment-level phrases. In an exemplary embodiment, the HKPE module 302 applies the LLM to the plurality of segments to determine the segment-level phrases. The LLM compares the list of words and/or phrases from each of the plurality of segments to the respective original segments and determines a respective first similarity value for each grouping of words from the list of words and/or phrases. The LLM then identifies at least one segment-level phrase from the groupings of words when a respective first similarity value is equal to or greater than a predetermined first similarity threshold value. In an exemplary embodiment, the applying of the LLM to the segments may include embedding each document by converting each word from the document into a corresponding numeric vector and then selecting segment-level phrases for which the similarity value is equal to or higher than a predetermined similarity threshold value. In an exemplary embodiment, this step may use a transformer-based encoder (e.g., BERT) that uses the numeric vectors to determine a similarity value between each segment-level phrase and a whole of the respective document.

At step S410, the HKPE module 302 separates each document into sentences. In an exemplary embodiment, the HKPE module 302 feeds the documents into a LLM and applies the LLM to separate the documents into sentences.

At step S412, the HKPE module 302 determines sentence-level phrases from each sentence. In an exemplary embodiment, the HKPE module 302 extracts sentence-level phrases by using an attention matrix. In an exemplary embodiment, the HKPE module 302 applies the LLM to the plurality of sentences to place each sentence into the attention matrix and compares each word from each sentence with each word from the remaining sentences of the same document to determine matching sequences of words from the attention matrix and identify the matching phrases. Sentence-level phrases are filtered by using POS tagging that labels each word in each of the matching phrases with a corresponding part of speech. In an exemplary embodiment, the applying of the LLM to sentences may include selecting sentence-level phrases for which the similarity value is equal to or higher than a predetermined similarity value. In an exemplary embodiment this step may use transformer-based phrasing that uses the numeric vectors to determine a semantic similarity value between each sentence-level phrase and a whole of the respective segment of document.

At step S414, the HKPE module 302 compares the segment-level phrases with the sentence-level phrases. In an exemplary embodiment, the HKPE module 302 looks for at least a partial match between each of the segment-level phrases and each of the sentence-level phrases. In an exemplary embodiment, any sentence-level phrase that that does not at least partially match with a segment-level phrase is filtered out. In an exemplary embodiment, the HKPE module 302 applies fuzzy matching when comparing the segment-level phrases with the sentence-level phrases.

At step S416, the HKPE module 302 identifies at least one informative phrase, based on the comparison between the segment-level phrases and the sentence-level phrases. In an exemplary embodiment, the informative phrases are each of the sentence-level phrases that at least partially match a segment-level phrase. In an exemplary embodiment, the HKPE module 302 applies fuzzy matching to determine the informative phrases from the segment-level phrases and the sentence-level phrases. The fuzzy matching analyzes a percentage of similarity between each segment-level phrase and each sentence-level phrase and determines whether there is at least a partial match.

At step S418, the HKPE module 302 identifies readable phrases from each document. In an exemplary embodiment, the HKPE module 302 calculates PMI between words for each document to identify at least one phrase having a PMI value that is equal to or greater than a predetermined PMI threshold value. A higher PMI value between words indicates a higher stickiness (i.e., the likeliness that the words are a common phrase). PMI may be calculated between words to extract a common phrase that is, for example, two to three words long. In an exemplary embodiment, the HKPE module 302 also calculates the entropy between the PMI identified phrases. Entropy refers to the randomness of words appearing on either side of the selected phrase. A common phrase tends to have a larger entropy (i.e., randomness and/or variety of words) on either side of the phrase. In an exemplary embodiment, the identified readable phrases are selected based on the calculated PMI and entropy values.

At step S420, the HKPE module 302 compares the informative phrases and the readable phrases. In an exemplary embodiment, the HKPE module 302 looks for at least a partial match between each informative phrase and each readable phrase. In an exemplary embodiment, each informative phrase that at least partially matches a readable phrase is assigned to the respective readable phrase. The assigned informative phrase may be used to categorize the readable phrase. In an exemplary embodiment, the HKPE module 302 applies fuzzy matching when comparing the informative phrases and the readable phrases.

At step S422, the HKPE module 302 generates a ranking of relative importance for each of the informative phrases and the readable phrases. In an exemplary embodiment, HKPE module 302 calculates a frequency of occurrence for each of the informative phrases and each of the readable phrases. The HKPE module 302 then calculates a uniqueness for each informative phrase and each readable phrase. Next, the HKPE module 302 generates a ranking of importance that includes each informative phrase and each readable phrase. The ranking of importance is based on a result of a combination of the frequency of occurrence and the uniqueness (e.g., TF-IDF) for each informative phrase and each readable phrase. In an exemplary embodiment, the HKPE module 302 may display the results via a GUI.

Figure 5:
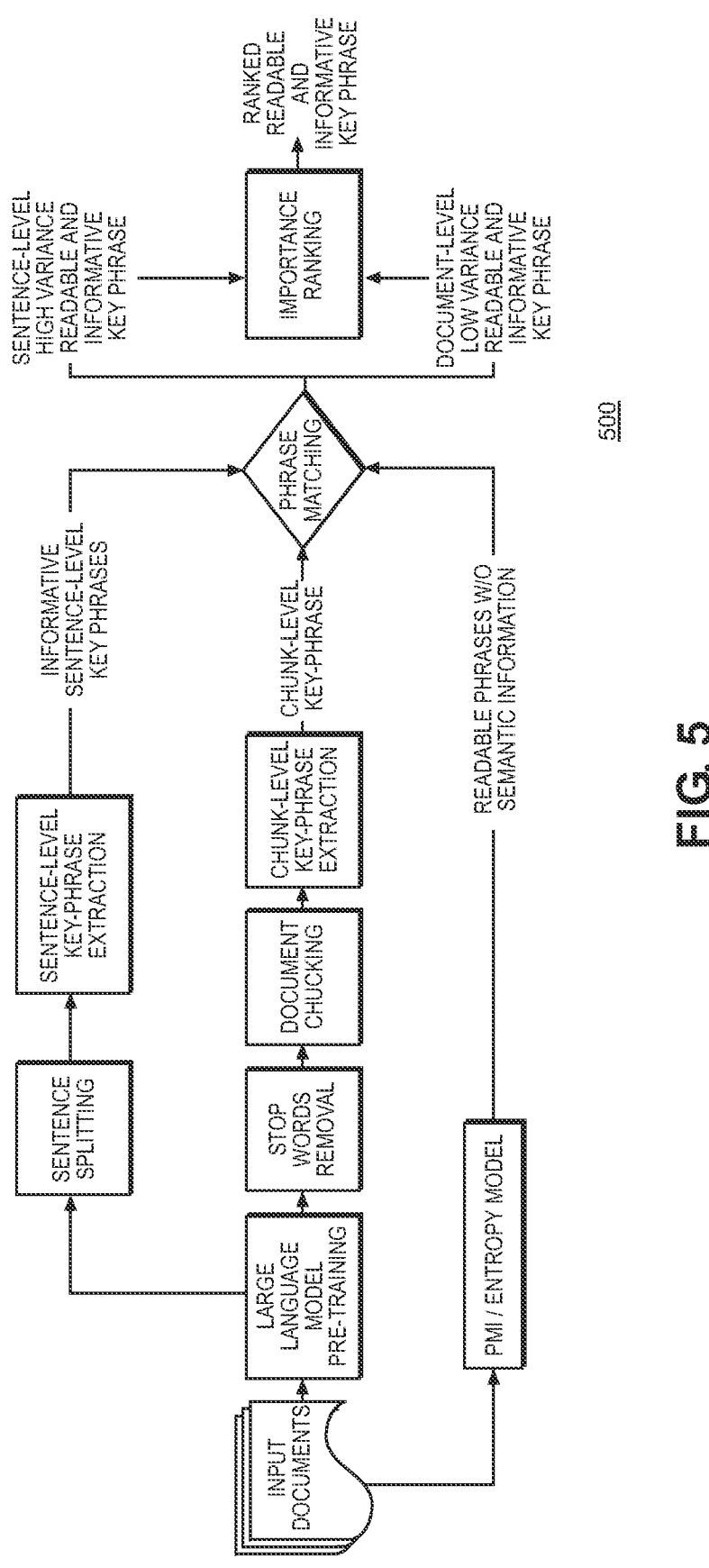
FIG. 5 is a flow diagram that illustrates a method for extracting both informative and readable phrases from multiple documents to generate key phrases.

FIG. 5 is a flow diagram 500 that illustrates a method for extracting both informative and readable phrases from multiple documents to generate key phrases. In an exemplary embodiment, as illustrated in FIG. 5, input documents are received by both a LLM pre-training module and a PMI/entropy model module. At one pathway from the LLM pre-training module, as illustrated in FIG. 5, the documents from the LLM model are split into sentences. Key phrases are then extracted from each sentence to get informative sentence-level key phrases. At a second pathway from the LLM pre-training module, as illustrated in FIG. 5, stop words are removed from the documents. Next, the documents are broken into chunks or segments. Chunk-level (i.e., segment-level) key phrases are then extracted from each chunk. As illustrated in FIG. 5, readable phrases without semantic information are extracted from the PMI and entropy model.

As illustrated in FIG. 5, each of the informative sentence-level key phrases, chunk-level key phrases, and readable phrases without semantic information are fed into a module for phrase matching. The phrase matching module outputs sentence-level high variance readable and informative key phrases as well as document-level low variance readable key phrases and informative key phrases. Each of these key phrases are then input into a module for importance ranking, which outputs ranked readable and informative key phrases.

In an exemplary embodiment, a hierarchical unsupervised KPE framework is used to build different modules with focus separately on readability and informativeness. The framework combines results from the different modules together with fuzzy matching.

In an exemplary embodiment, KPE model and framework includes: extracting informative phrases from chunks of documents by utilizing similarity values between embeddings generated from the LLM; extracting quality phrases from sentences of the documents with an attention-based model; extracting readable phrases from multiple documents utilizing pointwise mutual information and entropy; fuzzy matching between informative phrases and readable phrases; and ranking the phrases of each document by importance.

In an exemplary embodiment, embedding and attention matrices from LLMs extract informative phrases followed by a PMI-based statistical model to extract readable phrases. Informative phrases are then mapped to the readable phrases (e.g., by fuzzy matching) and ranked by importance which considers both frequency and uniqueness. The method can extract readable phrases while capturing key information of the documents. The method shows improvement on readability and informativeness and is also highly modularized. In an exemplary embodiment, the framework is split into the following four modules: document chunk-level informative phrase extraction module; sentence-level informative phrase extraction module; PMI readable phrase extraction module; and two-stage fuzzy matching module.

In an exemplary embodiment, the document-level informative phrase extraction module is designed to capture key information within each chunk of a document. Identifying key information may include: removing as many words as possible from the document without losing contextual information, to identify a list of words and/or phrases that is left within the document; and then comparing the similarity of extracted phrases and the original document to extract the key information. The similarity approach identifies key phrases that will have similar contextual information as in the original document.

In an exemplary embodiment, extracting document-level informative phrases may be done in three steps. 1) The documents are separated into chunks or segments with a fixed length (e.g., 100 words). Each chunk (i.e., segment) is kept relatively short to get more accurate phrases when extracting key information. 2) Remove stop words within each chunk. Removing stop words helps extracting words and/or phrases by sacrificing readability of the phrases. 3) Extract long phrases (e.g., 3-5 words) for each chunk, while keeping the top non-overlapping phrases as key phrases for each chunk.

In an exemplary embodiment, the sentence-level informative phrase extraction module is designed to capture informative phrases within each document. In an exemplary embodiment, the KPE utilizes an attention matrix of the LLMs to locate phrases. In an exemplary embodiment, extracting sentence-level informative phrases may be done in three steps: 1) Each of the documents is split into sentences. 2) Key phrases are extracted for each sentence using an attention matrix. 3) The extracted phrases are filtered using their composition of POS tags.

In an exemplary embodiment, the PMI-based readable phrase extraction module focuses on extracting short phrases with good readability (e.g., 'good morning'), regardless of informativeness. In an exemplary embodiment, extracting readable phrases may be done in two steps. 1) Calculate PMI between words to extract common phrases (e.g., 2-3 words). A higher PMI value indicates stickiness between the selected words (i.e., higher chance of being a phrase). 2) Calculate entropy on both sides of the combination of words. A common phrase tends to have larger entropy on both sides of a phrase (i.e., words appear 'randomly' before and after the phrase). For example, in the sentences 'we build natural language processing tools' and 'natural language processing is a popular technology', the phrase 'natural language processing' has larger entropy on both sides as compared to 'natural language'.

In an exemplary embodiment, the two-stage fuzzy matching module is designed to extract readable and informative phrases from the phrases extracted in the previous modules. In an exemplary embodiment, matching informative phrases with readable phrases may be done in two steps. 1) Match sentence-level phrases to document-level phrases. Any sentence-level phrase that partially matches with a document-level phrase is kept while sentence-level phrases with no match are filtered out. A sentence-level phrase that matches a document-level phrase indicates that the sentence-level phrase contains key information of the documents. Phrases matched in this step usually have relatively good readability and informativeness but high variance. 2) Assign phrases from previous step to readable phrases extracted by the readable phrase extraction module. This step assigns sentence-level phrases to low-variance readable phrases (e.g., 'Russia raised oil price', 'US oil price is raised' will both be assigned to 'raised oil price'), based on the insights generated for the low-variance phrases.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for extracting key phrases, the method being implemented by at least one processor, the method comprising:

receiving, by the at least one processor, at least one document;

analyzing, by the at least one processor, each of the at least one document to identify a plurality of segments having a predetermined fixed number of words and remove stop words from each respective one of the plurality of segments;

applying, by the at least one processor, at least one large language model (LLM) to the plurality of segments to identify at least one segment-level phrase from each of the at least one document;

extracting, by the at least one processor, each of the at least one segment-level phrase from each of the at least one document;

analyzing, by the at least one processor, each of the at least one document to identify a plurality of sentences, wherein the identifying of the plurality of sentences includes separating each of the at least one document into respective sentences that form the least one document;

applying, by the at least one processor, the at least one LLM to the plurality of sentences to identify at least one sentence-level phrase from each of the at least one document;

extracting, by the at least one processor, each of the at least one sentence-level phrase from each of the at least one document;

comparing, by the at least one processor, each of the at least one segment-level phrase with each of the at least one sentence-level phrase to determine whether at least one of the at least one sentence-level phrase at least partially matches a respective at least one of the at least one segment-level phrase;

identifying, by the at least one processor and based on the determination that at least one of the at least one sentence-level phrase at least partially matches a respective at least one of the at least one segment-level phrase, at least one informative phrase, wherein each of the at least one informative phrase is a first grouping of words that relate key information from the at least one document;

calculating, by the at least one processor, pointwise mutual information (PMI) between words for each of the at least one document to identify at least one readable phrase having a PMI value that is equal to or greater than a predetermined PMI threshold value, wherein the readable phrase includes the stop words;

extracting, by the at least one processor, the at least one readable phrase from each of the at least one document; and generating a first output that indicates each of the at least one readable phrase and each of the at least one informative phrase.

2. The method of claim 1, further comprising:

comparing, by the at least one processor, each of the at least one informative phrase with each of the at least one readable phrase to determine if at least one of the at least one informative phrase at least partially matches a respective at least one of the at least one readable phrase; and assigning, by the at least one processor, a category to at least one of the at least one readable phrase, wherein the category is based on the at least one of the at least one informative phrase that at least partially matches with the respective at least one of the at least one readable phrase.

3. The method of claim 1, wherein the applying of the at least one large language model (LLM) to the plurality of segments comprises:

comparing groupings of words from each of the plurality of segments, in which the stop words have been removed, to respective original segments with the stop words for determining a respective first similarity value for each of the groupings of words, and identifying the at least one segment-level phrase from each of the groupings of words when the respective first similarity value is equal to or greater than a predetermined first similarity threshold value.

4. The method of claim 1, wherein the applying of the at least one LLM to the plurality of sentences comprises:

using an attention matrix that places each respective sentence into the attention matrix and compares each respective word from each respective sentence with each respective word from remaining sentences of a respective same document;

determining matching sequences of words from the attention matrix to identify at least one matching phrase; and selecting the at least one sentence-level phrase by filtering each of the at least one matching phrase by using part-of-speech (POS) tagging that labels each respective word in each of the at least one matching phrase with a corresponding part of speech.

5. The method of claim 1, wherein the calculating of the PMI between words comprises:

determining, by the at least one processor, a probability that a second grouping of words appears together within a document;

selecting, by the at least one processor, at least one common phrase from the second grouping of words in which the determined probability is equal to or greater than a predetermined threshold percentage;

calculating an entropy with respect to the at least one common phrase that relates to a measure of randomness in words on each side of the at least one common phrase; and identifying, based on the calculated entropy, the at least one readable phrase.

6. The method of claim 1, wherein the applying of the at least one LLM to the plurality of segments comprises:

embedding the at least one document by converting each respective word from the at least one document into a corresponding numeric vector; and selecting, by the at least one processor using a transformer-based encoder that uses the numeric vectors to determine a second similarity value between each segment-level phrase and a whole of the respective at least one document, the at least one segment-level phrase for which the second similarity value is equal to or higher than a predetermined second similarity threshold value.

7. The method of claim 6, wherein the applying of the at least one LLM to the plurality of sentences comprises:

selecting, by the at least one processor using transformer-based phrasing that uses the numeric vectors to determine a semantic similarity value between each sentence-level phrase and the whole of the respective at least one document, at least one sentence-level phrase for which the semantic similarity value is equal to or higher than a predetermined semantic similarity value.

8. The method of claim 1, wherein the comparing of the each of the at least one segment-level phrase with the each of the at least one sentence-level phrase comprises applying fuzzy matching that analyzes a percentage of similarity between the at least one segment-level phrase and the at least one sentence-level phrase for the determination of the at least partial match.

9. The method of claim 1, further comprising:

comparing, by the at least one processor, each of the at least one informative phrase with each of the at least one readable phrase to determine at least one key phrase which relates to each of the at least one readable phrase that at least partially matches a respective at least one of the at least one informative phrase; and generating a second output that indicates the at least one key phrase.

10. The method of claim 8, further comprising:

calculating, by the at least one processor, a respective frequency of occurrence for each of the at least one informative phrase and each of the at least one readable phrase within each respective document of the at least one document;

calculating, by the at least one processor, a uniqueness for each of the at least one informative phrase and each of the at least one readable phrase within each respective document of the at least one document;

generating, by the at least one processor, a ranking of importance that includes each of the at least one informative phrase and each of the at least one readable phrase, wherein the ranking of importance is based on a result of a combination of the frequency of occurrence and the uniqueness for each of the at least one informative phrase and each of the at least one readable phrase; and displaying, via a graphical user interface (GUI), the ranking of importance.

11. A computing apparatus for extracting key phrases, the computing apparatus comprising:

a processor;

a memory;

a display; and a communication interface coupled to each of the processor, the memory, and the display, wherein the processor is configured to:

receive, via the communication interface, at least one document;

analyze each of the at least one document to identify a plurality of segments having a predetermined fixed number of words and remove stop words from each respective one of the plurality of segments;

apply at least one large language model (LLM) to the plurality of segments to identify at least one segment-level phrase from each of the at least one document;

extract each of the at least one segment-level phrase from each of the at least one document;

analyze each of the at least one document to identify a plurality of sentences, wherein the identifying of the plurality of sentences includes separating each of the at least one document into respective sentences that form the least one document;

apply the at least one LLM to the plurality of sentences to identify at least one sentence-level phrase from each of the at least one document;

extract each of the at least one sentence-level phrase from each of the at least one document;

compare each of the at least one segment-level phrase with each of the at least one sentence-level phrase to determine whether at least one of the at least one sentence-level phrase at least partially matches a respective at least one of the at least one segment-level phrase;

identify, based on the determination that at least one of the at least one sentence-level phrase at least partially matches a respective at least one of the at least one segment-level phrase, at least one informative phrase, wherein each of the at least one informative phrase is a first grouping of words that relate key information from the at least one document;

calculate pointwise mutual information (PMI) between words for each of the at least one document to identify at least one readable phrase having a PMI value that is equal to or greater than a predetermined PMI threshold value, wherein the readable phrase includes the stop words;

extract the at least one readable phrase from each of the at least one document; and generate a first output that indicates each of the at least one readable phrase and each of the at least one informative phrase.

12. The computing apparatus of claim 11, wherein the processor is further configured to:

compare each of the at least one informative phrase with each of the at least one readable phrase to determine if at least one of the at least one informative phrase at least partially matches a respective at least one of the at least one readable phrase; and assign a category to at least one of the at least one readable phrase, wherein the category is based on the at least one of the at least one informative phrase that at least partially matches with the respective at least one of the at least one readable phrase.

13. The computing apparatus of claim 11, wherein the processor is further configured to apply the at least one large language model (LLM) to the plurality of segments by:

comparing groupings of words from each of the plurality of segments, in which the stop words have been removed, to respective original segments with the stop words for determining a respective first similarity value for each of the groupings of words; and identifying the at least one segment-level phrase from each of the groupings of words when the respective first similarity value is equal to or greater than a predetermined first similarity threshold value.

14. The computing apparatus of claim 11, wherein the processor is further configured to apply the at least one LLM to the plurality of sentences by:

using an attention matrix that places each respective sentence into the attention matrix and compares each respective word from each respective sentence with each respective word from remaining sentences of a respective same document;

determining matching sequences of words from the attention matrix to identify at least one matching phrase; and selecting the at least one sentence-level phrase by filtering each of the at least one matching phrase by using part-of-speech (POS) tagging that labels each respective word in each of the at least one matching phrase with a corresponding part of speech.

15. The computing apparatus of claim 11, wherein the processor is further configured to calculate the PMI between words by:

determining a probability that a second grouping of words appears together within a document;

selecting at least one common phrase from the second grouping of words in which the determined probability is equal to or greater than a predetermined threshold percentage;

calculating an entropy with respect to the at least one common phrase that relates to a measure of randomness in words on each side of the at least one common phrase; and identifying, based on the calculated entropy, the at least one readable phrase.

16. The computing apparatus of claim 11, wherein the processor is further configured to apply the at least one LLM to the plurality of segments by:

embedding the at least one document by converting each respective word from the at least one document into a corresponding numeric vector; and selecting, using a transformer-based encoder that uses the numeric vectors to determine a second similarity value between each segment-level phrase and a whole of the respective at least one document, the at least one segment-level phrase for which the second similarity value is equal to or higher than a predetermined second similarity threshold value.

17. The computing apparatus of claim 16, wherein the processor is further configured to apply the at least one LLM to the plurality of sentences by:

selecting, using transformer-based phrasing that uses the numeric vectors to determine a semantic similarity value between each sentence-level phrase and the whole of the respective at least one document, at least one sentence-level phrase for which the semantic similarity value is equal to or higher than a predetermined semantic similarity value.

18. The computing apparatus of claim 11, wherein the processor is further configured to compare the each of the at least one segment-level phrase with the each of the at least one sentence-level phrase by applying fuzzy matching that analyzes a percentage of similarity between the at least one segment-level phrase and the at least one sentence-level phrase for the determination of the at least partial match.

19. The computing apparatus of claim 11, wherein the processor is further configured to:

compare each of the at least one informative phrase with each of the at least one readable phrase to determine at least one key phrase which relates to each of the at least one readable phrase that at least partially matches a respective at least one of the at least one informative phrase; and generate a second output that indicates the at least one key phrase.

20. A non-transitory computer readable storage medium storing instructions for extracting key phrases, the storage medium comprising executable code which, when executed by a processor, causes the processor to:

receive at least one document;

analyze each of the at least one document to identify a plurality of segments having a predetermined fixed number of words and remove stop words from each respective one of the plurality of segments;

apply at least one large language model (LLM) to the plurality of segments to identify at least one segment-level phrase from each of the at least one document, and extract each of the at least one segment-level phrase from each of the at least one document;

analyze each of the at least one document to identify a plurality of sentences, wherein the identifying of the plurality of sentences includes separating each of the at least one document into respective sentences that form the least one document;

apply the at least one LLM to the plurality of sentences to identify at least one sentence-level phrase from each of the at least one document;

extract each of the at least one sentence-level phrase from each of the at least one document;

compare each of the at least one segment-level phrase with each of the at least one sentence-level phrase to determine whether at least one of the at least one sentence-level phrase at least partially matches a respective at least one of the at least one segment-level phrase;

identify, based on the determination that at least one of the at least one sentence-level phrase at least partially matches a respective at least one of the at least one segment-level phrase, at least one informative phrase, wherein each of the at least one informative phrase is a first grouping of words that relate key information from the at least one document;

calculate pointwise mutual information (PMI) between words for each of the at least one document to identify at least one readable phrase having a PMI value that is equal to or greater than a predetermined PMI threshold value, wherein the readable phrase includes the stop words;

extract the at least one readable phrase from each of the at least one document; and generate a first output that indicates each of the at least one readable phrase and each of the at least one informative phrase.

* * * * *